(12) United States Patent  
Nishida

(10) Patent No.: US 6,504,302 B2  
(45) Date of Patent: Jan. 7, 2003

(54) HIGH-PRESSURE DISCHARGE LAMP

(75) Inventor: Kazuhisa Nishida, Tokyo (JP)

(73) Assignee: NEC Microwave Tube, Ltd., Sagamihara (JP)

(*) Notice: Subject to any disclaimer, the term of this patent is extended or adjusted under 35 U.S.C. 154(b) by 51 days.

(21) Appl. No.: 09/750,794

(22) Filed: Jan. 2, 2001

(65) Prior Publication Data

US 2001/0008366 A1 Jul. 19, 2001

(30) Foreign Application Priority Data

Jan. 12, 2000 (JP) ........................................ 2000-004036

(51) Int. Cl.[7] ............................ H01J 61/30; H01J 17/30
(52) U.S. Cl. ........................................ 313/634; 313/638
(58) Field of Search .............................. 313/30, 33, 34, 313/39, 566, 578, 623, 630, 634, 281, 282, 283, 284, 285

(56) References Cited

U.S. PATENT DOCUMENTS

| 4,305,016 A | * | 12/1981 | Schmidt ...................... 313/117 |
| 4,766,346 A | * | 8/1988 | Weiss et al. ............. 313/318.07 |
| 5,330,941 A | * | 7/1994 | Yaba et al. ................. 428/1.62 |
| 5,336,969 A | * | 8/1994 | Weiss et al. ................. 313/112 |
| 5,532,195 A | * | 7/1996 | Weiss et al. ................... 501/54 |
| 5,572,091 A | * | 11/1996 | Langer et al. ............... 313/493 |
| 5,631,522 A | * | 5/1997 | Scott et al. .................. 313/636 |
| 5,680,010 A | * | 10/1997 | Weiss et al. ................. 313/636 |
| 5,726,532 A | * | 3/1998 | Wittig et al. .................. 313/25 |
| 5,808,411 A | * | 9/1998 | Deisenhofer et al. ....... 313/493 |
| 5,831,309 A | * | 11/1998 | Englisch et al. ............ 156/281 |
| 6,069,456 A | * | 5/2000 | Fromm et al. .............. 313/637 |

FOREIGN PATENT DOCUMENTS

| JP | 63-236723 | 10/1988 |
| JP | 6-187944 | 7/1994 |
| JP | 6-302767 | 10/1994 |
| JP | 7-215731 | 8/1995 |
| JP | 8-81226 | 3/1996 |

* cited by examiner

Primary Examiner—Don Wong  
Assistant Examiner—Minh D A  
(74) Attorney, Agent, or Firm—McGinn & Gibb, PLLC

(57) ABSTRACT

A high-pressure discharge lamp includes: a quartz glass bulb; conductive elements; and a pair of electrodes. The conductive elements are airtightly sealed at sealing portions of the quartz glass bulb. Each electrode of the pair of electrodes is disposed so as to be opposite each other and connected to one of the conductive elements. The quartz glass bulb is formed as a single piece unit by using a synthetic quartz whose viscosity is about $10^{13}$ poise or more at about 1200° C.

8 Claims, 1 Drawing Sheet

HIGH-PRESSURE DISCHARGE LAMP

BACKGROUND OF THE INVENTION

1. Field of the Invention

The present invention relates to a high-pressure discharge lamp. More specifically, the present invention relates to a high-pressure discharge lamp which, even after being lit for a considerably long time, does not have problems such as deformation of the bulb thereof made of quartz glass and decrease in brightness of the discharge lamp due to devitrification and blackening of the quartz glass bulb.

2. Description of Related Art

In general, high-pressure discharge bulbs have a structure in which each electrode of a pair of electrodes (i.e., an anode and a cathode) is disposed so as to be opposite each other in a quartz glass bulb, which includes an expanded portion for luminescence and a sealing portion, and the anode and the cathode are jointed by, for instance, welding with molybdenum foil. Also, the sealing portion of the quartz glass bulb is airtight-sealed by, for example, welding with molybdenum foil. A gas for assisting an electric discharge, such as mercury vapor, is contained in the expanded portion for luminescence of the quartz glass bulb which has been sealed airtightly.

When such a high-pressure discharge lamp is used, a large amount of ultraviolet rays having short wavelengths are emitted because of the considerably high vapor pressure of the gas contained in the lamp and of the high pressure applied to tube walls. As a result, the temperature of the quartz glass bulb is increased significantly due to the absorption of the ultraviolet rays having short wavelengths. Thus, if natural quartz glass is used for the quartz glass bulb in a conventional manner, there are problems associated with the use thereof, such as deformation, devitrification, and blackening of the bulb, which shorten the lifetime of the bulb, because a minute amount of impurities is always contained in even high-quality natural quartz glass.

To solve the above-mentioned problems, for instance, the Japanese Unexamined Patent Application, First publication No. 6-187944 discloses a light emitting tube for a high pressure discharge lamp including a pair of electrodes and a composite quartz glass tube for sealing the pair of electrodes. An outer layer of the composite quartz glass tube is made of natural quartz glass having a viscosity of $10^{14.8}$ poise or more at 1025° C. and an inner layer thereof is made of synthetic quartz glass which includes impurities including, at least, alkali metals. The amount of each of alkali metal species is 0.2 ppm or less.

However, it is difficult to carry out a sealing process for the above-mentioned light emitting tube since the composite quartz glass tube has a dual structure and the dispersion of the inner diameter size thereof is quite large. As a result, the dispersion in the inner volume among the quartz glass bulb increases and the pressure of the discharge lamp is significantly varied. Also, since the alkali components of the natural quartz glass are dispersed towards the synthetic quartz glass during the process constructing the dual structure thereof, little suppression effect for the devitrification and the blackening is obtained. Moreover, the cost for producing the above-mentioned light emitting tube is expensive and, hence, not economical.

On the other hand, a quartz glass having a viscosity of $10^{13.0}$ poise or more at 1200° C. whose hydroxyl group concentration is 10 ppm or less is known as a highly thermostable quartz glass used for the semiconductor industry, such as core tube made of a quartz glass (refer to the Japanese Unexamined Patent Application, First publication No. 8-81226.) However, it had not been known that if a quartz glass bulb which is formed as a one-piece unit by using a synthetic quartz whose viscosity is about $10^{13}$ poise or more at about 1200° C. is used as a high-pressure discharge lamp, the deformation of the quartz glass bulb or the decrease in brightness of the discharge lamp due to the devitrification or the blackening of the bulb may be prevented even if the discharge lamp is used for a long time at about 1000–1200° C. under a high pressure of about 100–180 atmospheres.

The inventors of the present invention, after pursuing diligent studies to solve the above-mentioned problems, have discovered that it is possible to prevent the deformation of the quartz glass bulb and the decrease in brightness of the discharge lamp due to the devitrification and the blackening of the quartz glass bulb, even after being lit for a considerably long time, if a synthetic quartz glass having a viscosity of about $10^{13}$ poise or more at about 1200° C. is used to form a quartz glass bulb as a one piece unit for the high-pressure discharge lamp. Also, since the quartz glass bulb is formed in a single piece, the high-pressure discharge lamp may be easily produced.

SUMMARY OF THE INVENTION

It is therefore an object of the present invention to provide a high-pressure discharge lamp which, even after being lit for a considerably long time, does not have problems such as the deformation of bulb thereof made of quartz glass and the decrease in brightness of the discharge lamp due to the devitrification and the blackening of the quartz glass bulb. Another object of the present invention is to provide such a high-pressure discharge lamp which is readily produced.

Accordingly, the present invention provides a high-pressure discharge lamp including: a quartz glass bulb; conductive elements, the conductive elements being airtightly sealed at sealing portions of the quartz glass bulb; and a pair of electrodes, each of the pair of electrodes being disposed so as to be opposite each other and each electrode being connected to one of the conductive elements; wherein the quartz glass bulb is formed as a one piece unit by using a synthetic quartz whose viscosity is about $10^{13}$ poise or more at about 1200° C.

The present invention also provides a high-pressure discharge lamp wherein the conductive element is molybdenum.

The present invention also provides a high-pressure discharge lamp wherein the amount of alkali metals contained in the quartz glass bulb is about 0.01 ppm or less.

The present invention also provides a high-pressure discharge lamp wherein the amount of hydroxyl group contained in the quartz glass bulb is about 1 ppm or less.

According to the present invention, it becomes possible to prevent the deformation of the quartz glass bulb and the decrease in brightness of the discharge lamp due to the devitrification and the blackening of the quartz glass bulb, even after being lit for a considerably long time. Also, the high-pressure discharge lamp may be easily produced because the quartz glass bulb is formed in a single piece,.

BRIEF DESCRIPTION OF THE DRAWING

Some of the features and advantages of the invention have been described, and others will become apparent from the detailed description which follows and from the accompanying drawing, in which.

DETAILED DESCRIPTION OF THE INVENTION

Figure 1:
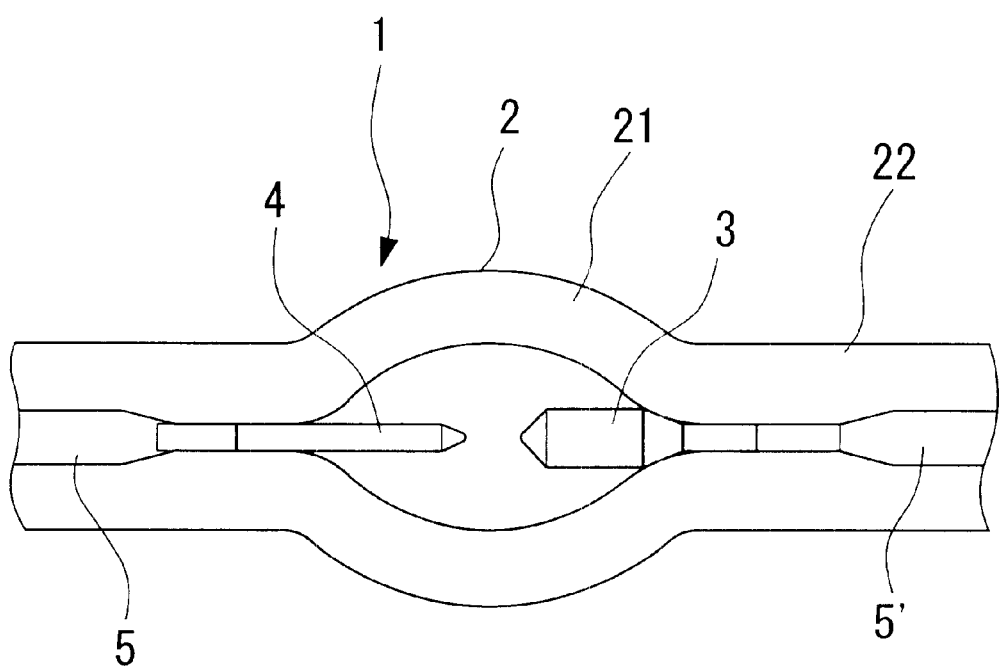
FIG. 1 is a diagram showing a schematic cross-sectional view of a high-pressure discharge lamp according to an embodiment of the present invention.

The invention summarized above and defined by the enumerated claims may be better understood by referring to the following detailed description, which should be read with reference to the accompanying drawing. This detailed description of a particular preferred embodiment, set out below to enable one to build and use one particular implementation of the invention, is not intended to limit the enumerated claims, but to serve as a particular example thereof.

FIG. 1 is a diagram showing a schematic cross-sectional view of a high-pressure discharge lamp according to an embodiment of the present invention. In FIG. 1, a high-pressure discharge lamp 1 includes a synthetic quartz glass bulb 2, an anode 3, a cathode 4, and molybdenum foils 5 and 5'. The synthetic quartz glass bulb 2 has an expanded portion 21. The shape of the expanded portion 21 is not particularly limited and may be spherical or oval-spherical. The material used for the anode 3 and the cathode 4 is preferably tungsten, molybdenum, or tantalum and, interalia, the use of tungsten is preferable. The distance between the anode and the cathode is not particularly limited. The anode 3 and the cathode 4 are joined to the molybdenum foils 5 and 5' by, for example, a welding process. The quartz glass bulb 2 is sealed airtightly with the molybdenum foils 5 and 5' at a sealing portion 22. A gas for assisting a discharge, such as a mercury gas, is contained and sealed in the expanded portion 21.

According to the present invention, it is essential that the quartz glass bulb which is formed as a one-piece unit has a viscosity of about $10^{13}$ poise or more at about 1200° C., and it is preferable that the bulb has a viscosity of about $10^{13.5}$ poise or more at about 1200° C. If such a quartz glass bulb having a viscosity of $10^{13}$ poise or more at 1200° C. is used for the high-pressure discharge lamp, it becomes possible to prevent the deformation of the quartz glass bulb and the decrease in brightness of the discharge lamp due to the devitrification and the blackening of the quartz glass bulb. Also, if such a quartz glass bulb having a viscosity of $10^{13}$ poise or more at 1200° C. formed in a unitary manner is employed, the high-pressure discharge lamp may be readily manufactured.

It is preferable that the amount of the alkali metals contained in the quartz glass bulb used in the present invention is about 0.01 ppm or less. If the amount of the alkali metals is about 0.01 ppm or less, the deformation of the quartz glass bulb or the devitrification may be prevented in a more effective manner even if the high-pressure discharge lamp is lighted for a long time. Note that in this specification, the term "alkali metals" means the 1st group of elements in the periodic table, such as Li, Na, and K. According to the present invention, it is preferable that the total amount of each of the alkali metal is about 0.01 ppm or less.

It is preferable that the amount of the hydroxyl group contained in the quartz glass bulb used in the present invention is about 1 ppm or less. If the amount is about 1 ppm or less, the deformation of the quartz glass bulb may be prevented in a more effective manner even if the high-pressure discharge lamp is lighted for a long time. Also, since the generation of gases, especially an emission of oxygen, may be prevented if the amount of the hydroxyl group contained in the quartz glass bulb is about 1 ppm or less, the occurrence of blackening of the bulb may be prevented in a more efficient manner.

The synthetic quartz glass bulb formed in a single piece which is used in the present invention may be prepared by using, for instance, the following procedure (refer to the Japanese Unexamined Patent Application, First publication No. 8-81226.) Firstly, a silicon compound, such as purified silicon tetrachloride and an alkyl silicate, is used as a starting material, and a silica porous material is prepared by subjecting the vaporized starting material to a hydrolysis process in an oxyhydrogen flame and then depositing the obtained silica powder onto a target to grow in an axial direction. In the above process, it is important that the amount of alkali metals, alkali-earth metals, and transition metals contained in the silicon compound be about 50 ppb or less, preferably about 20 ppb or less. The above-mentioned silicon compounds may be easily obtained by using, for instance, a distillation-purification process.

The concentration of the hydroxyl group contained in the silica porous material thus obtained may be decreased to about 1 ppm or less by subjecting the porous material to a heating process in an atmosphere containing hydrogen so that the bulk density thereof falls in the range between about 0.9 and 1.9 g/cm³. The temperature and the time used for the heating process is not particularly limited as long as the bulk density of the obtained product falls in the range between about 0.9 and 1.9 g/cm³. However, it may be preferable that the heating temperature in the process be, for instance, between about 1200 and 1350° C., and the time for heating be between about 30 minutes and 15 hours. Also, the hydrogen concentration is preferably between about 50 and 100 vol %, more preferably between about 75 and 100 vol %, from the viewpoint of decreasing the concentration of hydroxyl groups. Moreover, in order to prevent contamination by Fe or Cr, which may be reduced by an alkali metal or a hydrogen gas emitted during heating in an electric furnace, it is preferable to carry out the heating process in a core tube made of quartz glass. Further, in order to carry out a de-hydroxyl group process in a uniform manner in its radial and axial directions, it is preferable to perform the heating process using a soaking-heating type electric furnace having a soaking length of the electric furnace (for instance, the temperature range in which the difference of temperature is within 10° C.) of longer than the length of a processed object.

The silica porous material, which has been subjected to the above-mentioned heating process, is then subjected to another heating process carried out at about 1450–1600° C. under a helium or a vacuum atmosphere to obtain the quartz glass bulb used in he present invention. It is preferable that the two heating processes be carried out by using two separate electric furnaces in order to prevent a thermal deformation of the core tube made of quartz glass. Also, it is especially preferable that the heating process be performed in a helium atmosphere in order to reduce remaining bubbles and that the heating process be performed by using a zone heating type electric furnace whose soaking length is shorter than the length of a processed object.

Methods used for manufacturing the high-pressure discharge lamps according to the present invention are not particularly limited. However, it is preferable that the discharge lamp be manufactured by using the following method. Firstly, the electrodes and the molybdenum foils are joined by using, for instance, a welding process. Then, two assemblies of the electrodes and the molybdenum foils are prepared. One of the assemblies is disposed at a portion to be one of the sealing portions of the quartz glass bulb, which is roughly formed in a shape of the high-pressure discharge lamp, and, after the inside of the bulb is evacuated, the portion is shrunk by a high temperature heating process to seal the portion. After that, an illuminating material, such as mercury vapor, is put into the expanded portion from the other opening, and the other one of the assemblies is disposed at a portion to be another one of the sealing portions. Then, an inert gas having a pressure of one atmosphere or less is filled inside the tube and, at the same time, the portion is subjected to a heating process at a high temperature so that it is shrunk to seal the tube. In this manner, the high-pressure discharge lamp of the present invention may be produced. It is preferable, in the above process, that the expanded portion be cooled so that the material contained in the tube does not evaporate.

The characteristics of an embodiment of the high-pressure discharge lamp according to the present invention are described as follows:

| | |
|---|---|
| Electric power of the discharge lamp: | 120–180 W |
| Voltage of the discharge lamp: | 50–100 V |
| Distance between the electrodes: | 1.0–2.0 mm |
| Luminous efficacy: | 40–70 lm/W |
| Load applied to the tube wall: | 80–150 W/cm$^2$ |
| Radiation wavelength: | 360–700 nm |

It is preferable that the high-pressure discharge lamp according to the present invention be used under the condition of inner pressure of about 100–180 atmosphere and an internal temperature of about 1000–1200° C.

The high-pressure discharge lamp according to the present invention may be used in the same manner as conventional high-pressure discharge lamps. That is, when the high-pressure discharge lamp of the present invention is connected to a power source, a trigger voltage is applied to the cathode and the anode to start the discharge. In this manner, a desired brightness of the lamp may be obtained.

Having thus described an exemplary embodiment of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A high-pressure discharge lamp, comprising:

a quartz glass bulb;

conductive elements, said conductive elements being airtightly sealed at sealing portions of said quartz glass bulb; and a pair of electrodes, each electrode of said pair of electrodes being disposed so as to be opposite each other and each electrode being connected to one of said conductive elements; wherein said quartz glass bulb is formed as a one-piece unit by using a synthetic quartz whose viscosity is about $10^{13}$ poise or more at about 1200° C.

2. The high-pressure discharge lamp according to claim 1, wherein said conductive element is molybdenum.

3. The high-pressure discharge lamp according to claim 2, wherein a amount of alkali metals contained in said quartz glass bulb is about 0.01 ppm or less.

4. The high-pressure discharge lamp according to claim 3, wherein a amount of hydroxyl group contained in said quartz glass bulb is about 1 ppm or less.

5. The high-pressure discharge lamp according to claim 2, wherein a amount of hydroxyl group contained in said quartz glass bulb is about 1 ppm or less.

6. The high-pressure discharge lamp according to claim 1, wherein a amount of alkali metals contained in said quartz glass bulb is about 0.01 ppm or less.

7. The high-pressure discharge lamp according to claim 6, wherein a amount of hydroxyl group contained in said quartz glass bulb is about 1 ppm or less.

8. The high-pressure discharge lamp according to claim 1, wherein a amount of hydroxyl group contained in said quartz glass bulb is about 1 ppm or less.

* * * * *